No. 822,940. PATENTED JUNE 12, 1906.
E. J. GARVIN.
APPARATUS FOR RECOVERING PRECIOUS METALS.
APPLICATION FILED JAN. 15, 1906.
2 SHEETS—SHEET 1.
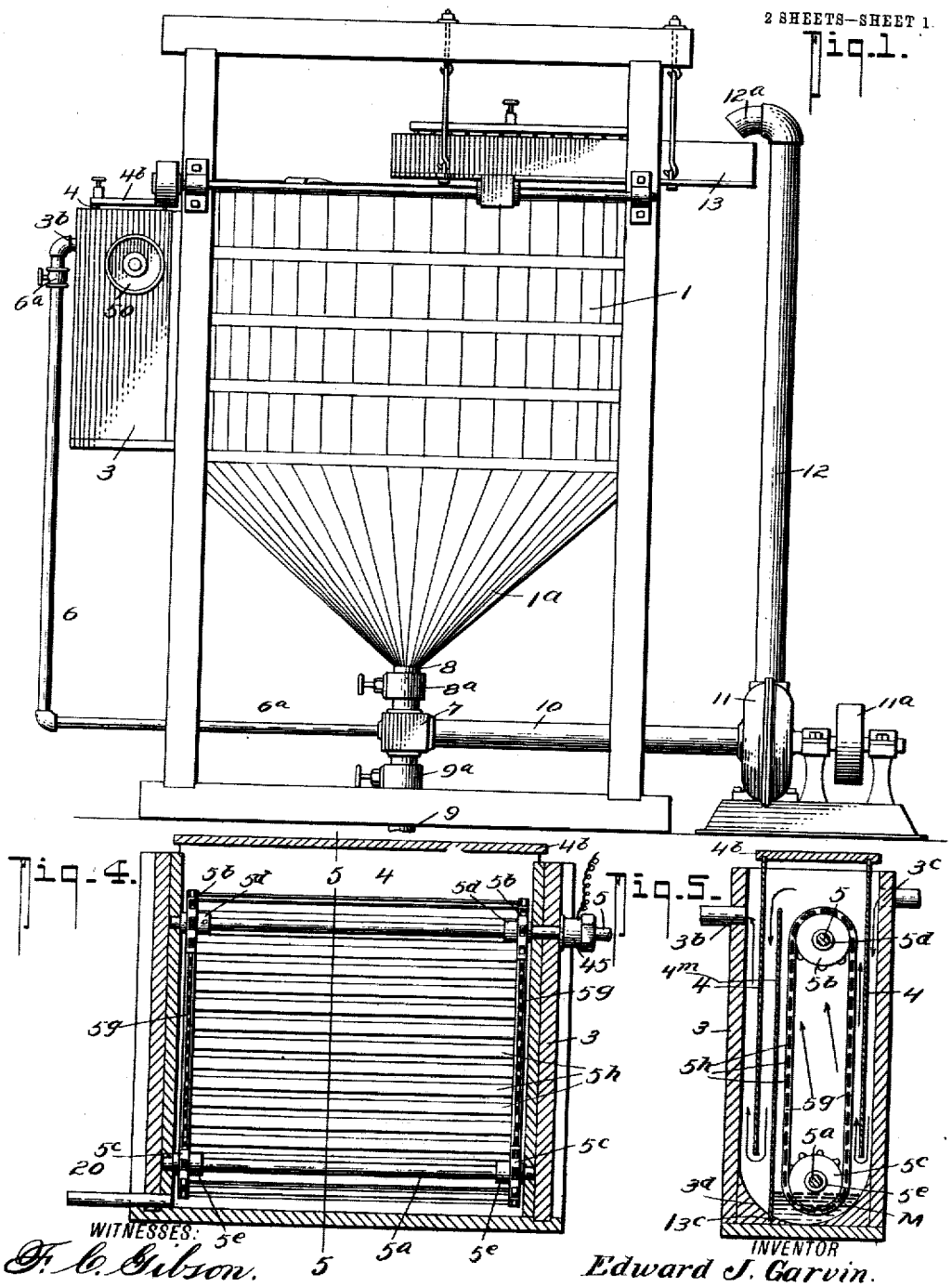
WITNESSES:
F. C. Gibson.
John T. Schrott
INVENTOR
Edward J. Garvin.
BY
Fred G. Dieterich & Co.
ATTORNEYS

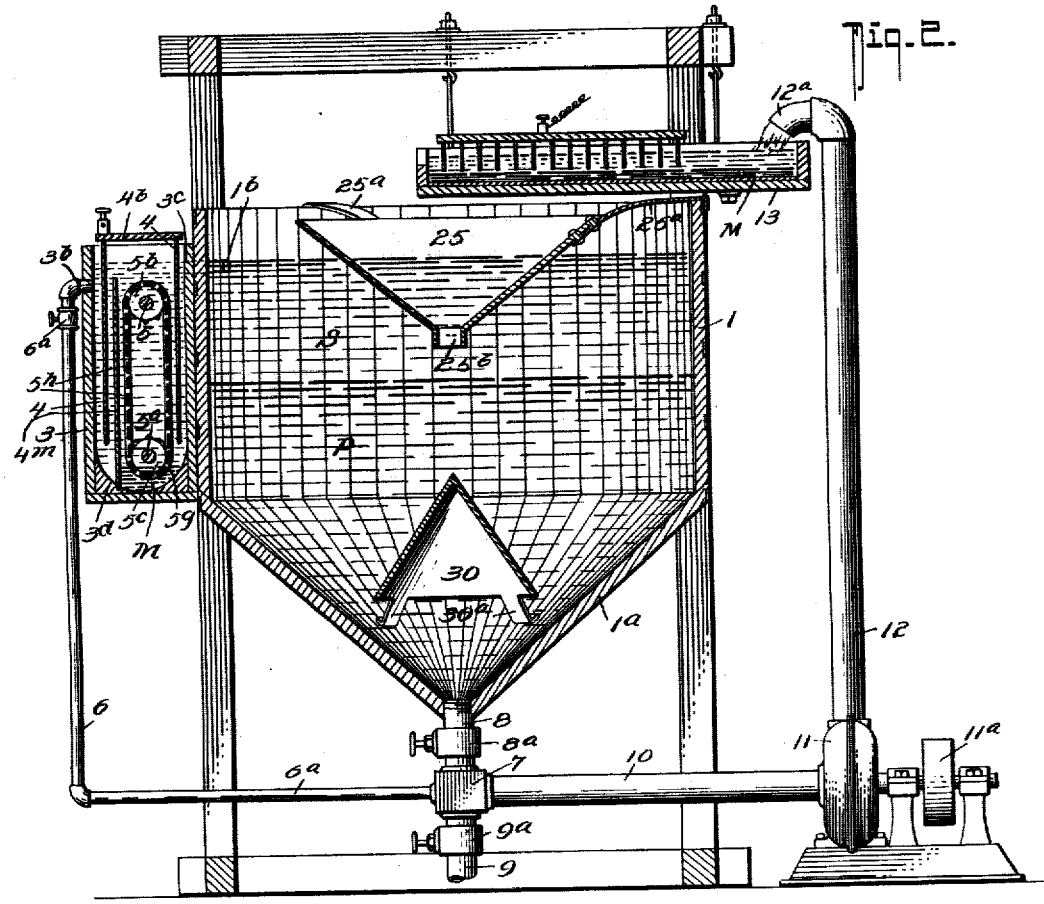

UNITED STATES PATENT OFFICE.

EDWARD J. GARVIN, OF PORTLAND, OREGON, ASSIGNOR TO THE GARVIN CYANIDE EXTRACTION COMPANY, OF PORTLAND, OREGON, A CORPORATION.

APPARATUS FOR RECOVERING PRECIOUS METALS.

No. 822,940.     Specification of Letters Patent.     Patented June 12, 1906.

Application filed January 15, 1906. Serial No. 296,149.

*To all whom it may concern:*

Be it known that I, EDWARD J. GARVIN, residing at Portland, in the county of Multnomah and State of Oregon, have invented certain new and useful Improvements in Apparatus for Recovering Precious Metals, of which the following is a specification.

My invention relates to certain new and useful improvements in apparatus for recovering precious metals from ore solutions and ores; and in its generic nature the invention consists in an improved precipitating tank for the solution and ore.

In its more detailed nature the invention comprises certain new and useful improvements over my Patent No. 809,939, issued January 16, 1906.

Primarily my invention has for its object to provide means for feeding the material into the main tank and spreading the same at the bottom thereof, so that a complete agitation of the materials in the main tank is insured; and the invention also has for its object to provide a precipitating-tank of greater capacity per unit size than appears in my application hereinbefore referred to.

With other objects in view than have heretofore been specified the invention comprises certain novel construction, combination, and arrangement of parts, all of which will be first described in detail and then be specifically pointed out in the appended claims, reference being had to the accompanying drawings, in which—

Figure 1 is a side elevation of my apparatus complete. Fig. 2 is a vertical longitudinal section thereof. Fig. 3 is a top plan view of the precipitating-tank. Fig. 4 is a vertical longitudinal section thereof. Fig. 5 is a cross-section on the line 5 5 of Fig. 4.

Referring now to the accompanying drawings, in which like numerals and letters of reference indicate like parts in all of the figures, 1 designates a receptacle or tank of any desired shape, with a sloping or approximately conical bottom $1^a$, as shown. The tank 1 is mounted upon a suitable supporting-frame, including standards and cross-braces, and the said tank has an outlet $1^b$ near its surface, at one side thereof, which communicates with the inlet $3^c$ of a tank 3, hereinafter known as the "precipitating-tank." The precipitating-tank 3 in my present invention comprises a housing or casing of substantially rectangular form, having an outlet $3^b$, with which the offtake-pipe 6 connects. The offtake-pipe 6 has a valve $6^a$ similar to that shown in my application above referred to.

Within the tank 3 are mounted a pair of parallelly-disposed shafts 5 $5^a$, mounted in suitable bearing portions in the end walls of the tank 3, and these shafts 5 $5^a$ respectively carry sprocket-wheels $5^b$ $5^c$, which are adjustably secured to the shafts 5 $5^a$, respectively, by the collars $5^d$ $5^e$ and the securing-bolts carried thereby, as shown. Over the sprocket-wheels $5^b$ $5^c$ endless chains $5^g$ $5^g$ pass, and these chains $5^g$ carry suitably-spaced copper strips $5^h$, which are secured at their ends to sprocket-chains $5^g$, and form an endless-conveyer-like device which is movable around the shafts 5 $5^a$ by motion imparted to the shaft 5 through any suitable drive-pulley 50, as shown, the shaft 5 passing through the stuffing-box 45, secured to the tank 3. The bottom of the tank 3 is formed semicircular in cross-section, as at $3^d$, similarly to that shown in my application above referred to, and in this form of my invention the shaft $5^a$ is set eccentrically to the center of curvature of the bottom $3^d$. An offtake-pipe 20 communicates with the bottom of the tank, through the medium of which the contents of the tank can be withdrawn when a cleaning up is desired. The end walls of the casing 3 are formed with vertical grooves $3^a$, spaced apart to receive the anode-plates 4 4, arranged one on each side of the endless cathode, and the plates 4 4 extend downwardly into the tank 3 and are spaced with their lower ends above the bottom thereof, while the upper ends of the plates are electrically connected together, as at $4^b$, and to the positive pole of any suitable source of electric energy. Between the plate 4 adjacent the outlet of the tank 3 and the endless cathode I dispose a plate $4^m$, whose lower edge fits in a groove $13^c$ in the bottom of the tank and whose upper edge terminates at a point below the inlet of the tank 3, as shown, so that the liquid as it enters the tank 3 through the inlet $3^c$ will follow the course indicated by the arrows in Fig. 5 and pass out through the outlet $3^b$. The plate $4^m$ is in electrical connection with the mercury M and serves as a supplementary cathode-plate, as well as serving to aid to direct the liquid in the direction of the arrows. The tank 1 is provided with an offtake pipe 8 at the bottom thereof, which connects through a valve 8ᵃ with the junction member 7, to which junction member 7 the pipe 6 also connects through a lateral 6ᵃ, as shown. The junction member 7 is connected through a pipe 10 with the pump 11, that is driven by the drive-pulley 11ᵃ similar to the manner disclosed in my copending application hereinbefore referred to.

12 designates a pipe which connects with the pump 11 and extends upwardly toward the top of the tank 1, and the said pipe 12 is provided with an outlet 12ᵃ, which discharges into the amalgamating-tank 13, as shown.

The amalgamating-tank 13 is of the same construction as that shown in my application hereinbefore referred to, and a detail description thereof is thought to be unnecessary in this application.

9 designates an offtake-pipe, also connected to the junction member 7 and also provided with a cut-off valve 9ᵃ, by means of which the tank 1 and the pipes 6 and 12 can be drained. Within the tank 1, and supported on the bottom thereof by suitable legs or standards 30ᵃ, is a cone-shaped member 30, adapted to coöperate with the funnel 25, that is suspended within the tank 1 by the hooks 25ᵃ, held over the upper edge of the tank, and the funnel 25 has its discharge-spout 25ᵇ arranged to discharge the material from the tank 13 into the tank 1 at a point below the outlet of the said tank 1 directly over the apex of the cone 30. The hopper or funnel 25 serves to discharge the pulp and solution received from the tank 13 at a point directly over the apex of the cone 30 in the bottom of the tank and also serves to carry the pulp to a depth in the tank below the discharge into the precipitating-tank, as before stated, so that the coarser particles will not raise and pass through the precipitating-tank. The cone 30 serves to keep the pulp from funneling or discharging from the center of the tank or leaving the outer edges without being circulated.

My invention operates in the same manner as that disclosed in my copending application before referred to, with the exception that in lieu of the cylindrical cathode 5 of my former application the endless-chain cathode of the present application is substituted. During the operation of my present invention mercury M is placed in the tank 3ᵈ, as indicated, and also in the tank 13, as indicated, for serving the same functions as in my application above referred to, the pulp and solution being indicated by P and S, respectively, in the drawings. As the endless cathode is operated the various metallic strips 5ʰ will be immersed in the mercury M in the tank 3 in a manner similar to the operation of the cathode roller 5 in my application hereinbefore referred to, and by use of the endless-chain cathode herein disclosed I am enabled to obtain a greater cathode-surface than is possible in my copending application.

From the foregoing description, taken in connection with the accompanying drawings, it is thought the complete construction, operation, and many advantages of my invention will be readily understood by those skilled in the art to which it appertains.

What I claim is—

1. In an apparatus of the class described, the combination with a main tank for receiving the pulverized ore and solvent, of a precipitating-tank, including means for separating the material, attached to the main tank near its top, and an amalgamating-tank including means for amalgamating the material suspended above the main tank, a hopper or funnel suspended within the main tank, and a spreading-cone on the bottom of the main tank, and means for causing a continuous circulation of the materials and solution through said tanks.

2. In an apparatus of the class described, the combination with a main tank and a precipitating-tank into which the main tank discharges and an amalgamating-tank which discharges into the main tank, and means for causing a continuous circulation of fluids through said tanks, of a funnel-shaped hopper suspended within the main tank and discharging at a point below the outlet to the main tank, substantially as shown and described.

3. In an apparatus of the class described, the combination with a main tank and a precipitating-tank into which the main tank discharges and an amalgamating-tank which discharges into the main tank, and means for causing a continuous circulation of fluids through said tanks, of a funnel-shaped hopper suspended within the main tank and discharging at a point below the outlet to the main tank, and a cone-shaped spreader supportable in the bottom of the main tank directly under the suspended funnel, substantially as shown and described.

4. In an apparatus of the class described, the combination with a main tank and a precipitating-tank into which the main tank discharges, and an amalgamating-tank which discharges into the main tank and means for causing a continuous circulation of fluids through said tanks, of a cone-shaped spreader supportable on the bottom of the tank, substantially as shown and described.

5. In an apparatus of the class described, the combination with a main tank and an amalgamating-tank discharging into the main tank, of a precipitating-tank into which the main tank discharges, said precipitating tank comprising a rectangular casing, a pair of shafts spaced apart and rotatably mounted in the casing, sprocket-wheels carried by said shafts, endless chains taking over said sprocket-wheels, a plurality of metallic strips connecting said endless chains, means for turning said shafts on their axes, a pair of anode-plates projected downwardly into said casing with their lower edges above the bottom thereof, a supplemental plate projected upward from the bottom of said casing with its upper edges below the upper edge of the casing, a mercury-pocket at the bottom of said casing into which the endless chains and the metallic strips are adapted to dip, an outlet for said casing, and means for causing a continuous circulation of fluids through all of said tanks, substantially as shown and described.

6. In an apparatus of the class described, a tank or receptacle, said tank or receptacle having a concaved bottom, a rotatable shaft mounted within said receptacle near the bottom, a similar shaft mounted in said receptacle near the top, sprocket-wheels carried by said shafts, endless chains passing over said sprocket-wheels, and a plurality of metallic strips carried by said endless chains, said concaved bottom adapted to hold an amalgamating substance, said strips adapted to be passed through said amalgamating substance, and means for rotating said shafts to carry said strips through said amalgamating substance, substantially as shown and described.

7. In an apparatus of the class described, a tank or receptacle, said tank or receptacle having a concaved bottom, a rotatable shaft mounted within said receptacle near the bottom, a similar shaft mounted in said receptacle near the top, sprocket-wheels carried by said shafts, endless chains passing over said sprocket-wheels, and a plurality of metallic strips carried by said endless chains, said concaved bottom adapted to hold an amalgamating substance, said strips adapted to be passed through said amalgamating substance, means for rotating said shafts to carry said strips through said amalgamating substance, a pair of anode-plates held within said receptacle and spaced from the bottom thereof, a supplemental plate held within said receptacle with its upper edge below the upper edge of the first-mentioned anode-plates and its lower edge engaging the bottom of the receptacle, substantially as shown and described.

EDWARD J. GARVIN.

Witnesses:
R. W. WILBUR,
LESTER L. LANGLEY.